(12) United States Patent
Mazzagatti et al.

(10) Patent No.: US 7,340,471 B2
(45) Date of Patent: *Mar. 4, 2008

(54) SAVING AND RESTORING AN INTERLOCKING TREES DATASTORE

(75) Inventors: Jane Campbell Mazzagatti, Blue Bell, PA (US); Jane Van Keuren Claar, Bethlehem, PA (US)

(73) Assignee: Unisys Corporation, Blue Bell, PA (US)

( * ) Notice: Subject to any disclaimer, the term of this patent is extended or adjusted under 35 U.S.C. 154(b) by 415 days.

This patent is subject to a terminal disclaimer.

(21) Appl. No.: 10/759,466

(22) Filed: Jan. 16, 2004

(65) Prior Publication Data

US 2005/0165749 A1    Jul. 28, 2005

(51) Int. Cl.
*G06F 17/00*    (2006.01)

(52) U.S. Cl. ............... 707/100; 707/103 R; 707/104.1
(58) Field of Classification Search ............... 707/100, 707/3, 103 R, 104.1
See application file for complete search history.

(56) References Cited

U.S. PATENT DOCUMENTS

| | | |
|---|---|---|
| 4,286,330 A | 8/1981 | Isaacson |
| 5,245,337 A | 9/1993 | Bugajski |
| 5,293,164 A | 3/1994 | Bugajski |
| 5,592,667 A | 1/1997 | Bugajski |
| 5,630,125 A | 5/1997 | Zellweger |
| 5,634,133 A | 5/1997 | Kelley |
| 5,829,004 A | 10/1998 | Au |
| 5,894,311 A | 4/1999 | Jackson |
| 5,918,229 A | 6/1999 | Davis et al. |
| 5,930,805 A | 7/1999 | Marquis |
| 5,963,965 A | 10/1999 | Vogel |
| 5,966,709 A | 10/1999 | Zhang |

(Continued)

FOREIGN PATENT DOCUMENTS

| | | |
|---|---|---|
| EP | 0 079 465 | 1/1985 |
| WO | WO 95/17783 | 6/1995 |
| WO | WO 99/34307 | 7/1999 |
| WO | WO 01/46834 | 6/2001 |
| WO | W/O 02/063498 | 8/2002 |
| WO | WO 02/063498 | 8/2002 |

OTHER PUBLICATIONS

Gschia-Yuan Teng & David L. Neuhoff, "An Improved Hierarchical Lossless Text Compression Algrithm", Proceedings 1995 Data Compression Conference.

(Continued)

*Primary Examiner*—Wilson Lee
*Assistant Examiner*—Thanh-Ha Dang
(74) *Attorney, Agent, or Firm*—Richard J. Gregson

(57) ABSTRACT

A tree-based datastore comprising a forest of interconnected trees that can be generated and/or accessed may require specialized saving and restoring processes to ensure that all the links are properly maintained whether it will be restored in full or in part. The processes act on known features of the trees based datastore to generate a file of metadata and packetize each of the nodes of the structure, carefully saving the links and lists of links with old memory addresses accounted for. When restoring the full or partial save to a new memory, a translation table is used to convert the addresses of the nodes and their links to appropriately matched locations in the new memory so that the structure of the data store can be reconstructed in the new location and ensuring that there is sufficient protected memory for the structure as the restore is accomplished.

16 Claims, 11 Drawing Sheets

U.S. PATENT DOCUMENTS

| | | | |
|---|---|---|---|
| 5,970,490 | A | 10/1999 | Morgenstern |
| 5,978,794 | A | 11/1999 | Agrawal et al. |
| 5,983,232 | A | 11/1999 | Zhang |
| 6,018,734 | A | 1/2000 | Zhang |
| 6,029,170 | A | 2/2000 | Garger |
| 6,031,993 | A | 2/2000 | Andrews et al. |
| 6,102,958 | A | 8/2000 | Meystel |
| 6,115,715 | A | 9/2000 | Traversat et al. |
| 6,138,115 | A | 10/2000 | Agrawal et al. |
| 6,138,117 | A | 10/2000 | Bayardo |
| 6,144,962 | A * | 11/2000 | Weinberg et al. ............. 707/10 |
| 6,160,549 | A | 12/2000 | Touma et al. |
| 6,233,575 | B1 | 5/2001 | Agrawal et al. |
| 6,275,817 | B1 | 8/2001 | Reed et al. |
| 6,278,987 | B1 | 8/2001 | Reed et al. |
| 6,286,002 | B1 | 9/2001 | Axaopoulos et al. |
| 6,341,281 | B1 | 1/2002 | MacNicol et al. |
| 6,356,902 | B1 * | 3/2002 | Tan et al. ..................... 707/10 |
| 6,360,224 | B1 | 3/2002 | Chickering |
| 6,373,484 | B1 | 4/2002 | Orell et al. |
| 6,381,600 | B1 | 4/2002 | Lau |
| 6,389,406 | B1 | 5/2002 | Reed et al. |
| 6,394,263 | B1 | 5/2002 | McCrory |
| 6,453,314 | B1 | 9/2002 | Chan et al. |
| 6,470,277 | B1 | 10/2002 | Chin et al. |
| 6,470,344 | B1 | 10/2002 | Kothuri et al. |
| 6,473,757 | B1 | 10/2002 | Garofalakis et al. |
| 6,477,683 | B1 | 11/2002 | Killian et al. |
| 6,499,026 | B1 | 12/2002 | Rivette et al. |
| 6,505,184 | B1 | 1/2003 | Reed et al. |
| 6,505,205 | B1 * | 1/2003 | Kothuri et al. ............. 707/100 |
| 6,581,063 | B1 | 6/2003 | Kirkman |
| 6,591,272 | B1 | 7/2003 | Williams |
| 6,604,114 | B1 | 8/2003 | Toong et al. |
| 6,615,202 | B1 | 9/2003 | Ding et al. |
| 6,624,762 | B1 | 9/2003 | End, III |
| 6,635,089 | B1 * | 10/2003 | Burkett et al. ............. 715/513 |
| 6,662,185 | B1 | 12/2003 | Stark et al. |
| 6,681,225 | B1 | 1/2004 | Uceda-Sosa et al. |
| 6,684,207 | B1 | 1/2004 | Greenfield et al. |
| 6,691,109 | B2 | 2/2004 | Bjornson et al. |
| 6,704,729 | B1 * | 3/2004 | Klein et al. .................... 707/5 |
| 6,711,585 | B1 * | 3/2004 | Copperman et al. ..... 707/104.1 |
| 6,745,194 | B2 | 6/2004 | Burrows |
| 6,748,378 | B1 | 6/2004 | Lavender et al. |
| 6,751,622 | B1 * | 6/2004 | Puri et al. ................... 707/101 |
| 6,760,720 | B1 | 7/2004 | De Bellis |
| 6,768,995 | B2 | 7/2004 | Their et al. |
| 6,769,124 | B1 | 7/2004 | Schoening et al. |
| 6,799,184 | B2 * | 9/2004 | Bhatt et al. ................. 707/102 |
| 6,804,688 | B2 | 10/2004 | Kobayashi et al. |
| 6,807,541 | B2 | 10/2004 | Bender et al. |
| 6,816,856 | B2 | 11/2004 | Baskins et al. |
| 6,826,556 | B1 | 11/2004 | Miller et al. |
| 6,831,668 | B2 | 12/2004 | Cras et al. |
| 6,868,414 | B2 | 3/2005 | Khanna et al. |
| 6,900,807 | B1 | 5/2005 | Liongosari et al. |
| 6,920,608 | B1 | 7/2005 | Davis |
| 6,931,401 | B2 | 8/2005 | Gibson et al. |
| 6,952,736 | B1 | 10/2005 | Westbrook |
| 6,965,892 | B1 | 11/2005 | Uceda-Sosa et al. |
| 7,027,052 | B1 | 4/2006 | Thorn et al. |
| 7,228,296 | B2 | 6/2007 | Matsude |
| 2002/0124003 | A1 | 9/2002 | Rajasekaran et al. |
| 2002/0138353 | A1 | 9/2002 | Schreiber et al. |
| 2002/0143735 | A1 | 10/2002 | Ayi et al. |
| 2002/0143783 | A1 | 10/2002 | Bakalash et al. |
| 2002/0188613 | A1 | 12/2002 | Chakraborty et al. |
| 2002/0194173 | A1 | 12/2002 | Bjornson et al. |
| 2003/0009443 | A1 | 1/2003 | Yatviskly |
| 2003/0033279 | A1 | 2/2003 | Gibson et al. |
| 2003/0093424 | A1 | 5/2003 | Chun et al. |
| 2003/0115176 | A1 | 6/2003 | Bobroff et al. |
| 2003/0120651 | A1 | 6/2003 | Bernstein |
| 2003/0204513 | A1 | 10/2003 | Bumbulis |
| 2003/0204515 | A1 | 10/2003 | Shadmon et al. |
| 2003/0217335 | A1 * | 11/2003 | Chung et al. ................ 715/514 |
| 2004/0107186 | A1 | 6/2004 | Najork et al. |
| 2004/0133590 | A1 | 7/2004 | Henderson et al. |
| 2004/0143571 | A1 | 7/2004 | Bjornson et al. |
| 2004/0169654 | A1 | 9/2004 | Walker et al. |
| 2004/0230560 | A1 | 11/2004 | Elza et al. |
| 2004/0249781 | A1 | 12/2004 | Anderson |
| 2005/0015383 | A1 | 1/2005 | Harjanto |
| 2005/0050054 | A1 | 3/2005 | Clark et al. |
| 2005/0060325 | A1 | 3/2005 | Bakalash et al. |
| 2005/0071370 | A1 | 3/2005 | Atschul et al. |
| 2005/0080800 | A1 | 4/2005 | Parupudi et al. |
| 2005/0097108 | A1 | 5/2005 | Wang et al. |
| 2005/0102294 | A1 | 5/2005 | Coldewey |
| 2005/0149503 | A1 | 7/2005 | Raghavachari |
| 2005/0171960 | A1 | 8/2005 | Lomet |
| 2005/0179684 | A1 | 8/2005 | Wallace |
| 2005/0198042 | A1 | 9/2005 | Russell et al. |
| 2005/0262108 | A1 | 11/2005 | Gupta |

OTHER PUBLICATIONS

Won Kim & Myung Kim, "Performance and Scaleability in Knowledge Engineering: Issues and Solutions", Journal of Object-Oriented Programming, vol. 12, No. 7, pp. 39-43, Nov./Dec. 1999.

Jeffrey O. Kephart & David M. Chess, "The Vision of Autonomic Computing", T.J. Watson Research Jan. 2003.

Linda Dailey Paulson, "Computer System, Heal Thyself", Aug. 2003.

Dave Gussow, "Headline: IBM-Enterprise Storage Server Shines at Colgate Palmolive", Jan. 6, 2003.

Caroline Humer, "IBM Creates Self-Healing Computer Unit", Jan. 8, 2003.

Burton F. W. et al:"Multiple Generation Text Files Using Overlapping Tree Structures", Computer Journal, Oxford University Press, Surrey, GB. vol. 28, No. 4 Aug. 1985 , pp. 414-416.

* cited by examiner

Address Translation Table

| OLD MEMORY ADDRESS 1 | NEW MEMORY ADDRESS 1 |
|---|---|
| OLD MEMORY ADDRESS 2 | NEW MEMORY ADDRESS 2 |
| OLD MEMORY ADDRESS 3 | NEW MEMORY ADDRESS 3 |
| OLD MEMORY ADDRESS 4 | NEW MEMORY ADDRESS 4 |
| OLD MEMORY ADDRESS 5 | NEW MEMORY ADDRESS 5 |
| OLD MEMORY ADDRESS 6 | NEW MEMORY ADDRESS 6 |
| OLD MEMORY ADDRESS 7 | NEW MEMORY ADDRESS 7 |
| OLD MEMORY ADDRESS 8 | NEW MEMORY ADDRESS 8 |
| OLD MEMORY ADDRESS 9 | NEW MEMORY ADDRESS 9 |
| ... | ... |

*Figure 7*

SAVING AND RESTORING AN INTERLOCKING TREES DATASTORE

FIELD OF THE INVENTION

This invention relates to the field of manipulation of interlocking trees datastores, particularly to allowing for saving and retrieval of interlocking trees data stores.

BACKGROUND OF THE INVENTION

We have developed a system and various methods for creating and using interlocking trees datastores. In particular, these structures and methods have been described in copending patent applications U.S. Ser. Nos. 10/385,421, and 10/666,382, by inventor Mazzagatti. While the system and method we describe in this patent relate with particularity to the specific interlocking trees datastores which inventor Mazzagatti hereof described in the above-referenced patent (applications), the system and Methods described herein may be applicable to similar structures.

While the interlocking trees datastores structure created by the system originally described in co-pending patent application U.S. Ser. No. 10/385,421 provides many useful traits for relating the data to itself in various ways, and for generating results to various inquiries without the need to generate special structures to obtain the results, heretofore there have been fundamental limits oh its usefulness. One of the limitations was that the data structure in memory in a computer works while in place, but was not amenable to moving, or to saving and subsequent restoration. We previously had to re-teach, that is, recreate (or, more exactly, allow our inventive systems to re-create) an entire new (copy or instantiation) of the interlocking trees datastore every time we needed to move it or needed to shut down the computer system in which it existed;. Thus, the availability of portability and longevity for interlocking trees datastores despite computer system failure were unavailable to the interlocking trees datastores prior to this development.

Given that the data structure we created did not exist in computer systems prior to our development, we found little in the way of prior designs for such systems to accommodate our need. Accordingly we were forced to design a specific way to save our structure so that it could be restored without losing the connections that make it what it is; that it, the pointer structure needed to be restored correctly, despite the changed address space in new systems into which it might be ported or in the same computer system from which it was saved and to which it needed to be restored. The root nodes needed their data retained and access to their pointers into the structure restored. All of the nodes needed to have the same access to their pointers, even though they may all, later be restored to different addresses, and we needed to accomplish this in an OS-independent and machine-independent way so that the interlocking trees datastore could be used in any computer environment. A tree-based datastore comprising a forest of interconnected trees is generated and/or accessed. The tree-based datastore comprises a first tree that depends from a first root node and may include a plurality of branches. Each of the branches of the first tree ends in a leaf node. Each leaf node may represent an end product, or a subcomponent node. A second root of the same tree-based datastore is linked to each leaf node representing an end product. Finally, the tree-based datastore, comprises a plurality of trees in which the root node of each of these trees can be described as an elemental node. The root node of each of these trees may be linked to one or more nodes in one or more branches of the first tree. The nodes of the tree-based datastore contain only pointers to other nodes in the tree-based datastore, and may contain additional fields wherein one such may be a count field. Additionally, means to get probabilities of the coincidence of variables related to particular nodes as identified by desired contexts within one or more defined foci are described. Further, the application of logical operators to queries regarding such variables is shown.

SUMMARY OF THE INVENTION

In order to save and be able to restore a tree-based datastore comprising one or more levels of forests of interconnected trees that is, preferably generated and/or accessed by an innate learning process similar to or the same as what we described in U.S. patent application Ser. No. 10/385,421, the supporting structures, the organization of the nodes, and all the elemental data needs to be saved.

As is described in earlier patents on the preferred interlocking trees datastore, each level of the tree-based datastore comprises a first tree that depends from a first root node and may include a plurality of branches. The first root may represent a concept, such as but not limited to, a level begin indicator. Each of the branches of the first tree ends in a leaf node or end product node. A second root of the same level of the tree-based datastore is linked to each leaf node of the first tree that represents an end product. Hence, the second root is essentially a root to an inverted order of the first tree or subset of the first tree, but the first tree is not duplicated. The second root may represent a concept, such as but not limited to, a level end indicator. Finally, the tree-based datastore comprises a plurality of trees in which the root node of each of these trees may include data such as a dataset element or a representation of a dataset element. This type of root node is referred to herein as an elemental root node. The elemental root node of each of these trees may be linked to one or more nodes in one or more branches of the unduplicated first tree. The non-root nodes of the tree-based datastore essentially contain only pointers to other nodes in the tree-based datastore, and may contain additional fields wherein one such additional field may be a count field. The roots of the trees in the forest of trees comprising each level of the tree-based datastore are also comprised of pointers, however the root nodes may, in addition, contain data that represents information (i.e., contain data that is or represents data such as dataset elements or concepts such as level begin or level end indicators); all the other nodes of the tree-based datastore only point to other nodes and contain essentially no data. In one embodiment the data is an integer that is associated with a character, a pixel representation, a condition such as begin indicator, end indicator, beginning of field indicator or the like, although the invention is not so limited. Multiple levels of the above-described tree-based datastore may be generated and accessed; the end products of a lower level becoming the elemental-root nodes of the next level.

The structure of the nodes themselves is generally maintained through a limited set of data fields per node. There are fields for the Case, the Result, the as case list pointer, the asResult list pointer and additional fields including at least a count field in most forms of the structure, as well as a value field for each elemental root node.

In order to save the structure as set forth above and as described in greater detail in the above-listed co-pending patent applications, incorporated hereinto by this reference in their respective entireties, the supporting structures should be saved, but depending upon what kind of restore is planned, some of these may be lost without harm. The supporting structures will vary depending of course upon the form of the interlocking trees datastore we are saving and how we intend to restore it.

The interlocking trees datastore structure itself must then be traversed by a saving engine that accesses each node, and from the information in each node, creates a node packet for saving. In the preferred embodiment, the node packet will contain metadata created by the saving engine including preferably, the length of the packet for the node. The engine will then save the packet to permanent memory. We discuss later how this metadata can be otherwise stored than in the packet itself.

In determining which supporting structures need to be saved, some choices include a file header containing a creation date (for the save), a file ID, a list of values for what we like to call "sensors" but what we commonly describe as elemental root nodes or their addresses which point to their values, a list of strings representing the end product nodes of the structure (because they represent all the "thoughts" or strings of nodes within the forests of interlocking trees datastore), any needed metadata which might describe the data structures of the underlying OS or computer system in which it resides, password protection if any, how lists of pointers are ordered in the nodes, and any information of that nature if needed to restore the structure or determine the addresses of information in the structure which is being saved. Additionally the header may save, k state variables (such as how many additional fields are supported in a node, what kinds of queries may be going on, how the asCase list and asResult lists are structured, data sources, switches and data streams) and/or data sources descriptors such as hooks identifying what sources to accept queries and or get information from and the like. Data about all these items could be in a single header or all or some of it could be in little headers for each packet or for packets that use particular items, or in some cases none of this information needs to be saved at all. One of ordinary skill in programming arts will understand that a system can be assumed based on a known environment or the like which may make keeping such data irrelevant in certain circumstances. (A data stream is a term indicating a data set and its related input sources whether it be static or dynamic).

The node packet itself should have the Case and Result pointers and any additional fields, the asCase list of pointers and the asResult list of pointers, as well as the size of the packet. In the preferred embodiments, the size of the packet is just counted in a counter each time a new packet is prepared for storage or stored. The total memory length, given normal programming constraints and practices, is placed into the header or otherwise saved for the whole interlocking trees datastore memory area. It should be noted that in most situations only the lengths of the asCase and asResult lists will vary so it may be that only these are stored and other length data known or computed.

Traversing the structure can be done in different ways in order to access all the nodes. One can start from the primary root nodes and traverse along the asCase paths, or from the end product nodes and follow the backward asCase links until all primary root nodes are located, or from each of the root nodes, following asResult links from each.

By saving properly, we also enable the restoration of partial interlocking trees datastores, which can retain the usefulness of the full structure's knowledge without its bulk for particular applications. Generally, if we wish to constrain a fully developed interlocking trees datastore, we can save it by only traversing the parts within the constraints of interest and do a restore of all that is saved. Thus, for example, we can eliminate all data that has end product nodes of no continuing interest to us through this process. Other kinds of partial saves are not presently recommended. However, we believe we will develop appropriate partial save techniques other than this in the future.

Restoring the structure requires allocating the memory needed for the restore and reading the supporting structures that have been saved. Each node packet should be read and memory allocated, while constructing an address translation table. The address translation table is then used by the next pass of the restore routine to convert the old memory addresses to new memory addresses for each node. Each node packet is then reconstructed with its pointers and pointer lists. The memory and supporting structures will have then been-restored. Alternatively, one could store relative addresses and restore with just the base relative address.

End product nodes of one level of a KStore structure may be the elemental root nodes representing dataset elements that are combined to generate a next level of subcomponent nodes. This process can be repeated any number of times, creating any number of levels of asCase trees. Additionally, elemental root nodes of a level may be decomposed to generate lower level nodes and roots. End product nodes of one level become the elemental root nodes of the next level through a special instance of an asResult tree of the lower level, that is, the asResult tree of the lower level having the root node that represents the lower level ending indicator. The asResult tree of the lower level having the root node that represents the lower level ending indicator, thus, is a second root into an inversion of the asCase tree of the lower level.

In all cases, elemental root nodes from each level should be identified as they are created. The metadata this creates is part of the metadata about the interlocking trees datastore structure that needs to be saved in order to have a successful restore.

BRIEF DESCRIPTION OF THE DRAWINGS

The foregoing summary, as well as the following detailed description of embodiments of the invention, is better understood when read in conjunction with the appended drawings. For the purpose of illustrating the invention, there is shown in the drawings exemplary constructions of the invention; however, the invention is not limited to the specific methods and instrumentalities disclosed. In the drawings:

FIG. 7 is a block diagram illustrating a preferred form of Address Translation Table for use in accord with the invention;

DETAILED DESCRIPTION OF ILLUSTRATIVE EMBODIMENTS

Overview

Although we have described in previously mentioned patent applications a system and method for creating a datastore, which we now call KStore, we feel it necessary to repeat some of the description in order to familiarize the reader with the concepts which the present invention takes for granted as existing technology, but we believe these concepts are found nowhere in the computer data arts anywhere else. The KStore generally comprises at least one level of forests of interconnected trees. The forest of interconnected trees of each level of the datastore captures information about combinations of nodes representing a level begin and a dataset element (creating a subcomponent node) or a subcomponent node and a dataset element node or a subcomponent node and a node representing a level end indicator in an iterative process that results in the generation of a single asCase tree composed of nodes linked by asCase tree branches and multiple asResult trees. The nodes of the asCase branches depend from a first root. For example, referring to FIG. 10, nodes 1050, 1002, 1004, 1024, 1026, 1027, and 1030 is an exemplary asCase tree depending from a first begin indicator root 1050. AsResult tree examples include for example the following trees: node 1051, and 1002 (one asResult tree), nodes 1053, and 1003 and 1005 (a second example asResult tree), and nodes 1057, 1033, 1031, and 1027 (a third example asResult tree) which among many others can be found in this diagram. The right side asResult tree is a special instance of asResult tree because the root (node 1061) represents an end indicator.

Figure 9:
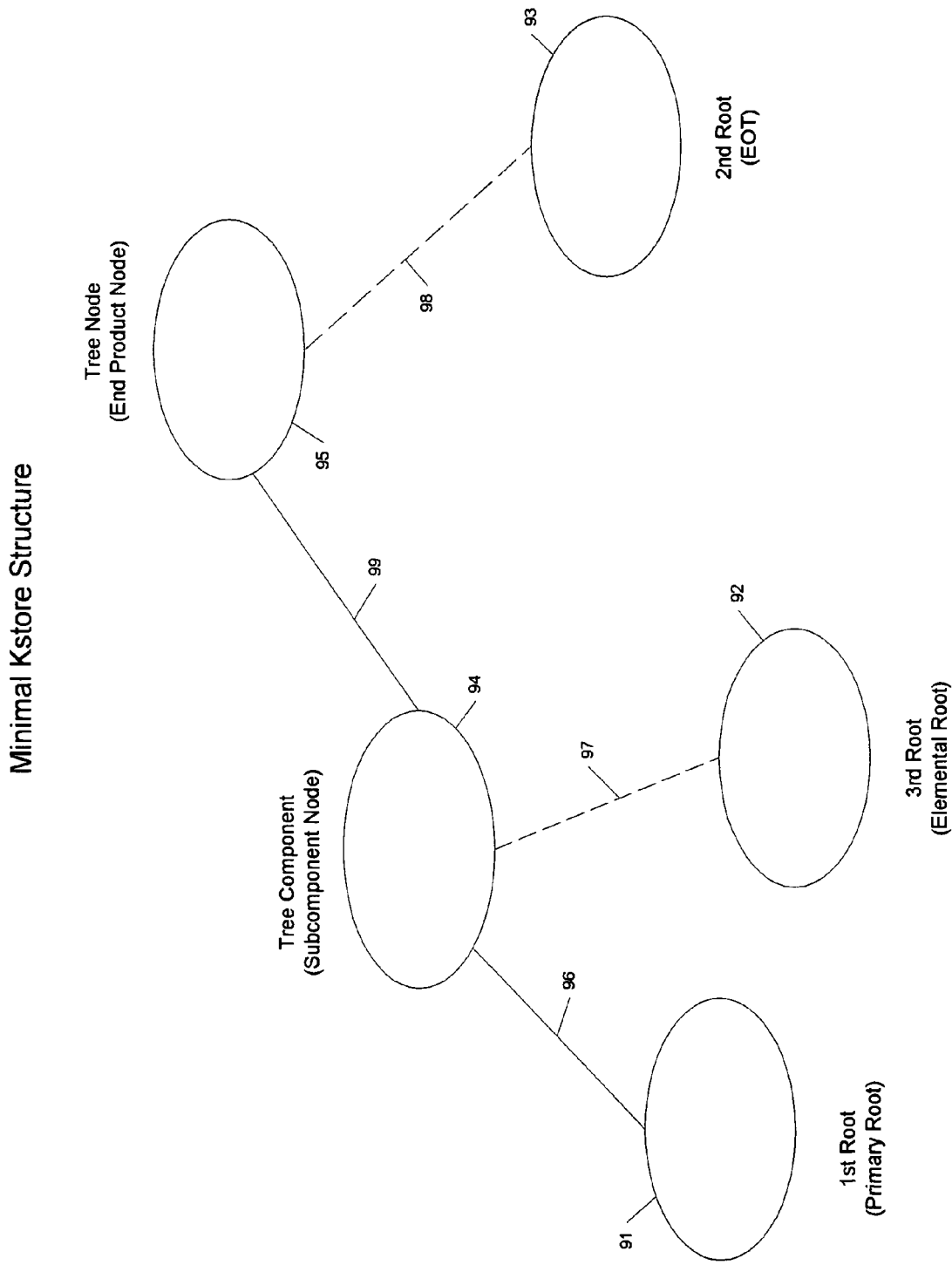
FIG. 9 is a block diagram illustrating a minimal structure of an interlocking trees datastore, which we call a KStore in accordance with embodiments of the invention.

In order to see the structure at its most basic form, please refer to FIG. 9 in which the smallest unit of the interlocking trees data store structure is pictured, having nodes 91, 95, which are connected by links 96-99. The base structure will have a primary root (1st root, node 91) connected through a link 96 to a subcomponent node 94. A $3^{rd}$ root, (elemental root) node 92 will be connected also to subcomponent node 94 by a link 97. (Thus node 94 is a representation of whatever is indicated in the data, that is, node 94 represents an instance in the data of elemental node 91 followed by elemental node 92). Node 95 is connected to node 94 by link 99, and the path 91-96-94-99-95 may be called a path or a thread that begins at the primary root and tends at the end product node 95. (A path can be any connected line of links and nodes). The end product node is also an instance of a $2^{nd}$ root node (end of thought node) 93, and is connected to the path by link 98.

Each branch of the asCase tree of a given level begins with a combination of a node representing a level begin indicator and a node representing a dataset element into a subcomponent node. A subcomponent node may be iteratively combined with a dataset element node into another, subcomponent node. A subcomponent may be combined with a node representing a level end indicator to create an end product node. This process can be repeated and may result in the formation of multiple asCase tree branches depending from the first root.

For example, if the indivisible elemental components of a particular interlocking trees structure are alphanumerics, subcomponents may be combinations of letters that are not words and end products may be words. Alternatively, subcomponents may be combinations of alphanumerics that comprise a partial stock number or order number and end products may be a complete stock or order number, to mention just two possible uses of many, of an alphanumeric universe of input applied to the invention.

End products of one level may be the dataset elements of a next level. The end product dataset elements may be used to generate a next level of subcomponents, in the same fashion that the dataset elements of the lower level are used to create lower level subcomponents and end products. For example, in the particular interlocking trees structure described above, the end products of one level (words) can be the dataset elements from which a higher level end product (a sentence) may be created. This process can be repeated any number of times, creating any number of levels of asCase trees in the datastore.

Figure 10:
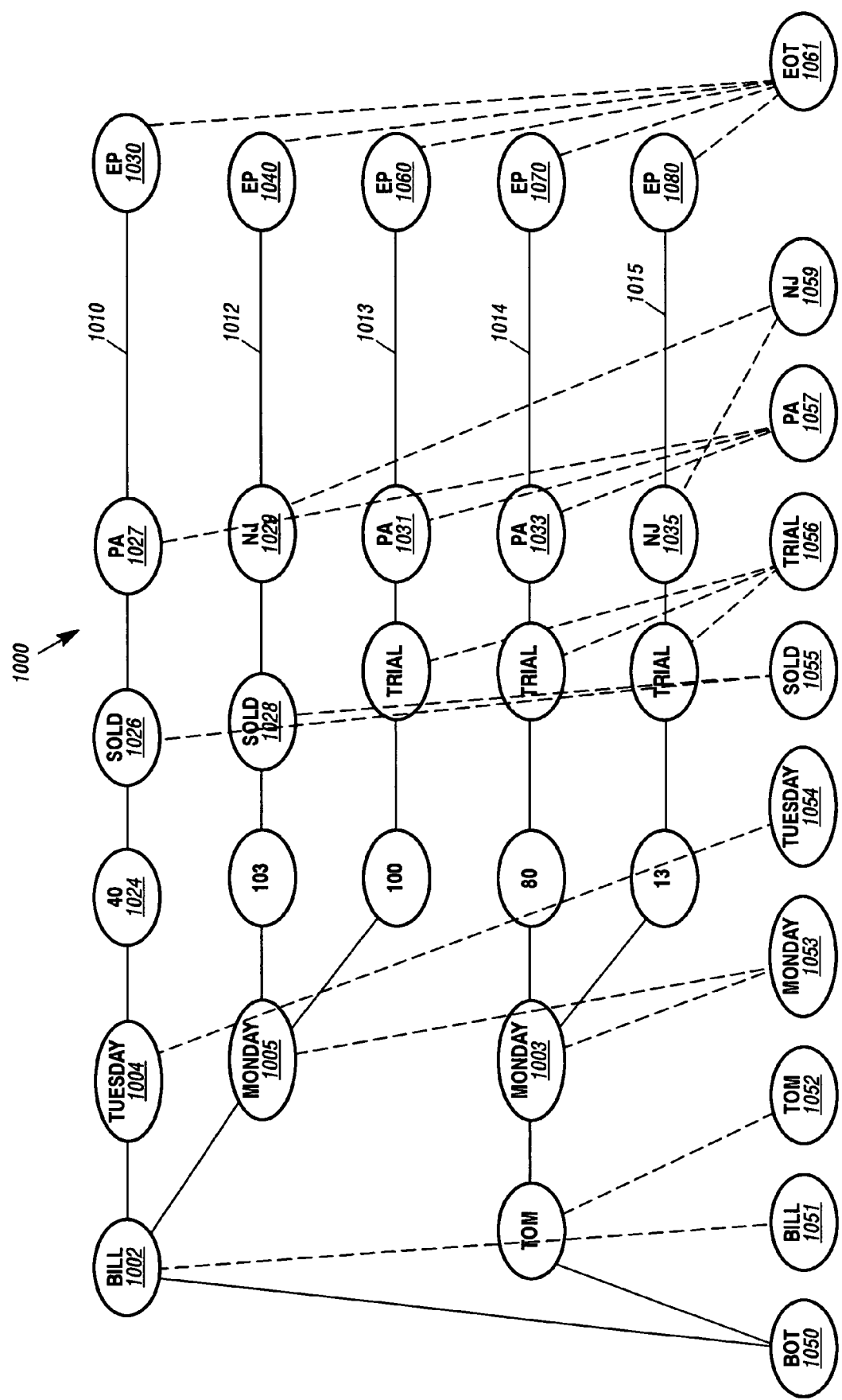
FIG. 10 is a block diagram illustrating a small KStore interlocking trees datastore, in accordance with embodiments of the invention.

Nodes such as root nodes 91 and 92 in FIG. 9 and 1050-1059 of FIG. 10 are referred to herein as elemental nodes because these nodes represent dataset elements and comprise indivisible units from which divisible units (subcomponents and end products) are composed. Nodes such as 94, 95, 1004, 1024, 1033 and the like are referred to herein as subcomponents or subcomponent nodes because these nodes represent a combination of a concept indicator such as a begin indicator and a node representing a dataset element, or a combination of a subcomponent and a node representing a dataset element that does not comprise an end product or a combination of a subcomponent and a node representing an end indicator that does comprise an end product. Nodes such as node 1030 or 95 represent an end product. In the example cited, dataset elements are letters, subcomponents represent combinations of letters that do not comprise words and end products are words. It will be noted that the set of root nodes includes "BOT", signifying, in the example, the beginning of a word, thought, or string, and "EOT", signifying the end of a word, thought, or string of nodes. It will be appreciated that "BOT" and "EOT" represent begin and end indicators to which the invention is not limited. The use of other such indicators is contemplated, as is the absence of one or both such indicators. In one embodiment of the invention, an end product is distinguishable from a subcomponent because of a link from the node to a root node representing the EOT concept.

If nodes represented letters in a first level, a higher level, using words as the level dataset elements in a KStore structure, could comprise sentences. Similarly, pixels as nodes for one level could comprise areas in a picture at a next higher level, and whole pictures at a yet higher level. Sentences may be combined to create paragraphs (a higher level yet than words), and solon. Additionally, dataset elements of a higher level may be decomposed to generate lower levels of the interlocking trees datastore. In one embodiment of the invention, the asResult tree that initiates from the level end indicator is used to define the dataset elemental of the next level. The end indicator is a second root into an inverted order of the interlocking trees datastore as defined by the asCase tree in one embodiment of the invention.

As nodes are created, asCase and asResult links may be simultaneously generated at each level. An asCase link represents a link to the first of the two nodes from which a node is created. It will be appreciated that asCase branches of the asCase trees may be created by the generation of the asCase links as the input is processed. The asCase branches of each level provide a direct record of how each subcomponent and end product of the level was created. Hence the asCase branches can be used for any purpose for which knowing how subcomponents and end products are created is useful. If, for example, the input to the interlocking trees generator comprises a universe of correctly spelled words, the resulting asCase links of the generated interlocking trees could be used as a spelling checker, to list just one example out of many possible examples of the utility of the datastore.

Additionally, the branches of the asCase tree also represent one possible hierarchical relationship of nodes in the asCase tree. For example, if the data received by the interlocking trees generator is "Tom sold 100 PA. Bill sold 40 NJ." the asCase tree generated comprises a view of the data in a "state information within the context of salesman" context or hierarchy.

An asResult link represents a link to the second of the two nodes from which a node is created. The generation of the asResult links creates a series of interlocking trees where each of the asResult trees depend from a root comprising a dataset element. This has the result of recording all encountered relationships between the elementals and asCase trees in the datastore. That is, the asResult trees capture all possible contexts of the nodes of the interlocking trees. The asResult trees can be used for any purpose for which knowing the context or relationships between nodes is useful. If, for example, the input to the interlocking trees datastore generator comprises a universe of sales data including salesman name, day of the week, number of items and state, the resulting asResult links of the generated interlocking trees datastore could be used to extract information such as: "What salesmen sell in a particular state?" "Row many items were sold on Monday?" "How many items did Salesman Bob sell on Monday and Tuesday?" and the like,—all from the same interlocking trees datastore, without creating multiple copies of the datastore.

Subcomponents and end products may be classified using the information stored in the asResult trees. It will be appreciated that the aforementioned information is actually stored by the structure of the interlocking trees datastore that is built rather than explicitly stored in the subcomponent and end product nodes of the tree. Because only the root nodes of the interlocking trees datastore may include data, asResult links can be followed back to the root node to determine if the subcomponent or end product belongs to the class of data represented by the root node. It will be further appreciated that this feature causes the datastore to be self-organizing, in accordance with the process described below. If, for example, the input to the interlocking trees datastore generator were "CAT TAB", information stored in the structure of the resultant interlocking trees datastore could be used to determine that both end products "BOT-C-A-T-EOT" and "BOT-T-A-B-EOT" contain the elemental "A", or said another way, the class of subcomponents/end products containing "A" include "BOT-C-A-T-EOT" and "BOT-T-A-B-EOT. Furthermore, by following the asCase links of the nodes containing "A", other subcomponents and end products containing "A" can be found along the branch of the asCase tree.

To show how this works in most preferred embodiments of the invention, links between nodes are bi-directional. Using the example above, a root node representing the letter "A" may include a pointer to a node BOT-C-A in node A's asResult list while the node BOT-C-A may include a pointer to the node A as its asResult pointer and so on.

In another embodiment of the invention, links between nodes are uni-directional. For example, in this embodiment, node BOT-C-A includes an asCase pointer to node BOT-C and an asResult pointer to the root node representing A but the root node A does not include a pointer to node BOT-C-A in its asResult list.

Exemplary Computing Environment

Figure 1:
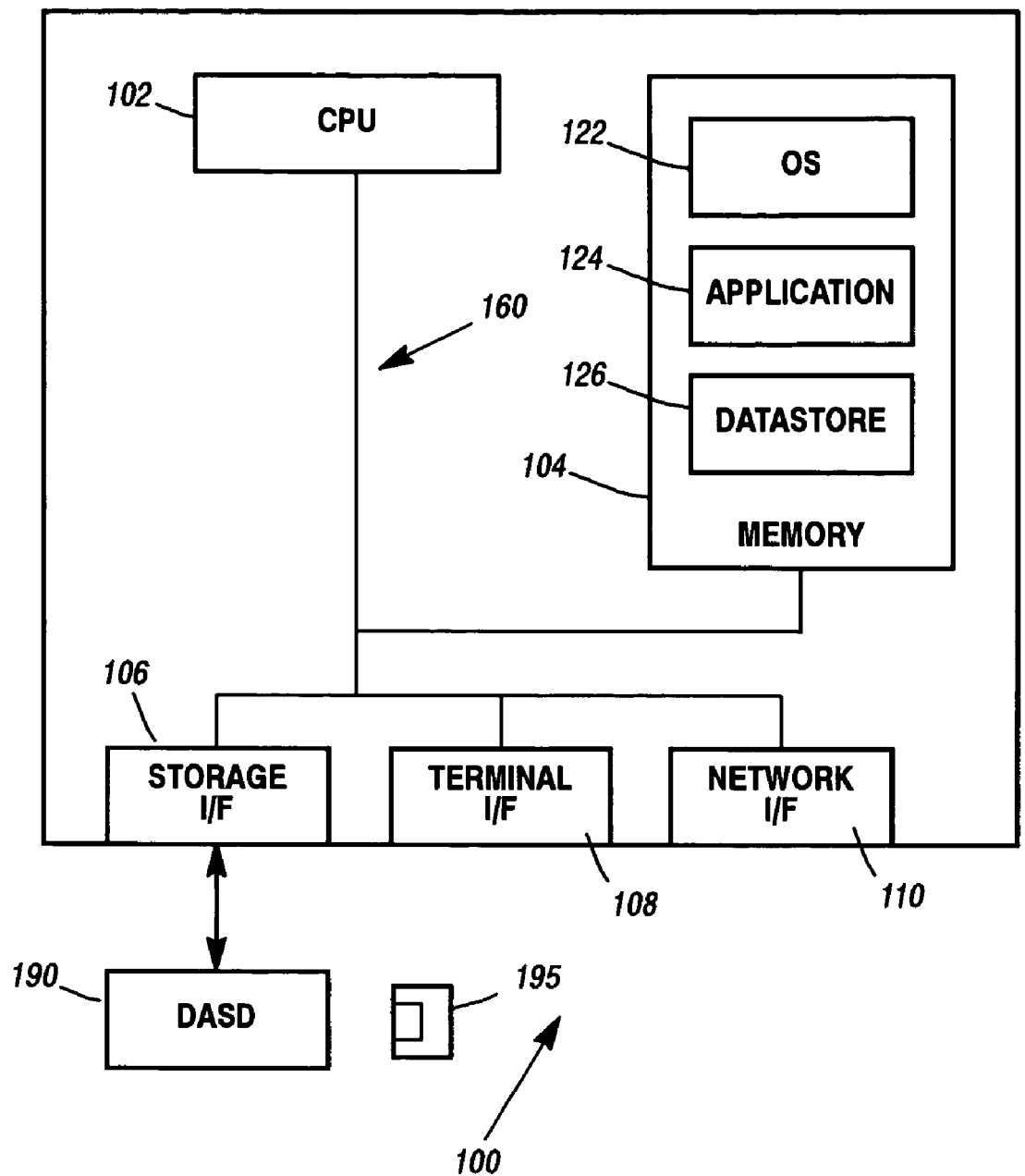
FIGS. 1 and 1A are block diagrams illustrating two phases of exemplary computing environments in which aspects of the invention may be implemented.

FIG. 1 is a block diagram of an exemplary computer system 100 in which aspects of the present invention may be implemented. Computer system 100 may be any suitable system, such as but not limited to a mainframe, minicomputer, IBM compatible personal computer, Unix workstation or network computer. One skilled in the art will appreciate that the apparatus of the present invention may apply to any computer system including but not limited to a multi-user computer system or single user computer. As shown in FIG. 1, computer system 100 comprises central processing unit (CPU) 102 connected to main memory 104, auxiliary storage interface 106, terminal interface 108, and network interface 110. These system components are connected via system bus 160. Auxiliary storage interface 106 is used to connect storage devices, such as but not limited to DASD devices 190, storing data on a disk such as but not limited to disk 195, to computer system 100.

Main memory 104, encompassing the entire virtual memory of computer system 100, includes an operating system 122 and an application 124, and may also include an interlocking trees datastore 126. The interlocking trees datastore 126 may be used to provide data storage that can be quickly searched for data in multiple contextual modes without requiring a duplication of data. Computer system 100 may use well-known virtual addressing mechanisms that allow the programs of computer system 100 to behave as if they have access to a large single storage entity rather than access to multiple, smaller storage entities such as main memory 104 and DASD devices 190. Hence, while operating system 122, application 124, and interlocking trees datastore 126 are shown to reside in main memory 104, those skilled in the art will recognize that these elements are not necessarily all completely located in main memory 104 at the same time.

While computer system 106 is shown to include only a single CPU and system bus, one skilled in the art will understand that the present invention may be implemented using a system that includes multiple CPUs and/or buses. Terminal interface 108 may be used to connect one or more terminals to computer system 100. The referenced terminals may be dumb terminals or fully programmable workstations and may be employed to enable system administrators and users to communicate with computer system 100.

Network interface 110 may be used to connect other computer systems and/or workstations to computer system 100. The network to which network interface 110 interfaces may be a local area network (LAN), wide area network (WAN), an internet, extranet or the Internet, or any other suitable network. Operating system 122' may be an operating system such as OS/2, WINDOWS, AIX, UNIX, LINUX or any other suitable operating system.

Application program 124 can be any type of application program which accesses data stored in interlocking trees datastore 126. Thus, the application could comprise a data analytics application, data warehousing application, intrusion detection system, to name several examples, although the invention is not limited thereto.

Interlocking trees datastore 126 provides a data storage structure that enables users to access the same datastore to obtain information associated with any context. The term data, as used herein can include any type of computer stored information such as but not limited to numbers, text, graphics, formulas, tables, audio, video, multimedia or any combination thereof. Interlocking trees datastore 126 can be implemented as part of application 124, as part of operating system 122 or as a separate datastore product that can be adapted to provide data storage for a wide variety of applications.

While the present invention is described in the context of a fully functional computer system, one of skill in the art will appreciate that the present invention is capable of being distributed as a program product in a variety of forms, and that the present invention applies equally, independent of the particular type of signal bearing media that carry out the distribution. Examples of media carrying such signals include but are not limited to floppy disks, hard drives, CD ROMs, digital and analog communication links over electrical, optical, wireless or other suitable mediums.

Figure 1A:
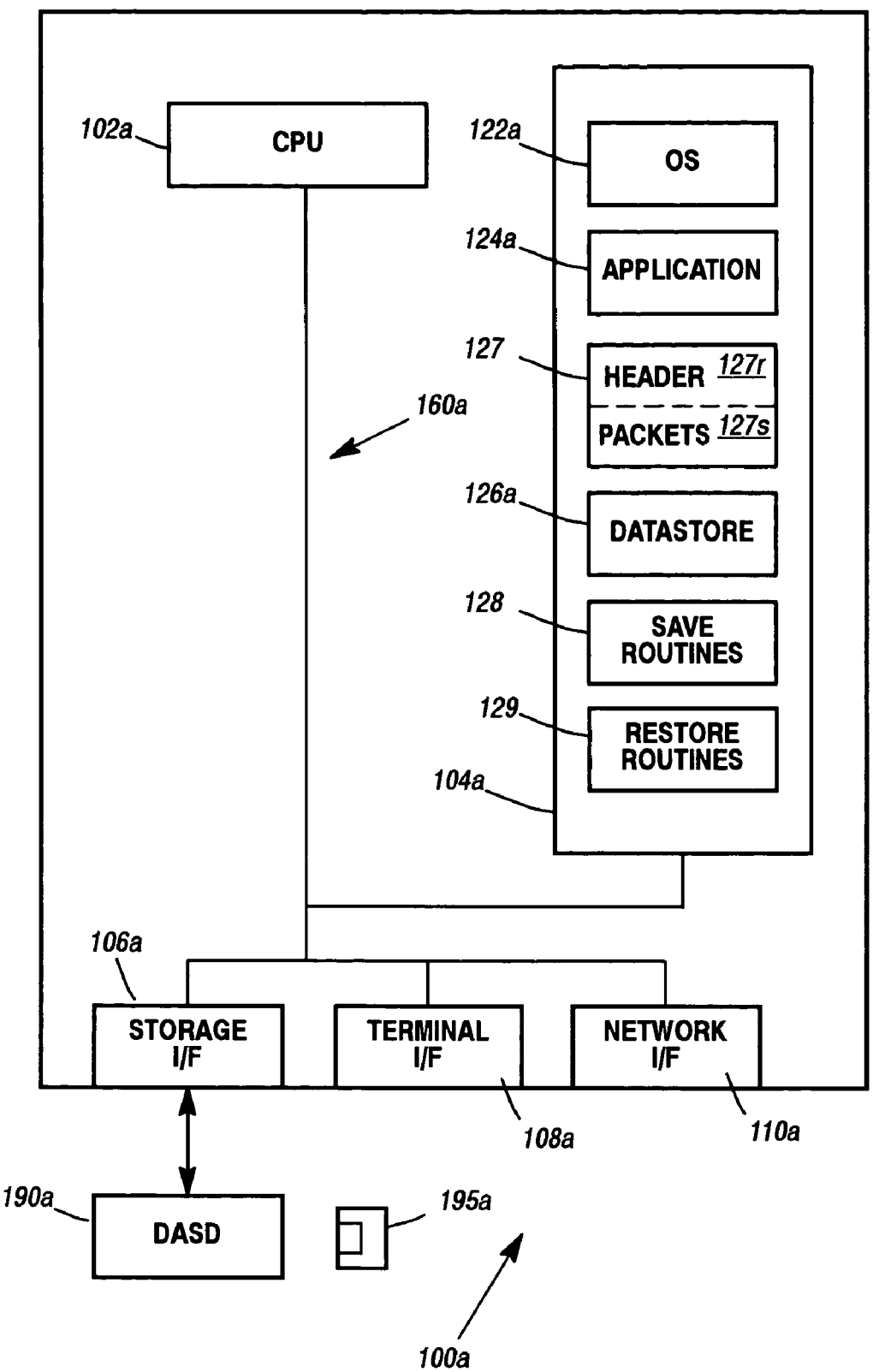

FIG. 1A is similar to FIG. 1 except it contains blocks representing a KStore being saved. Other, repeated elements of the diagram of FIG. 1A simply have an "a" annexed to their identifying numerals. The Kstore (Datastore 126*a*) is being worked by the Save Routines 128 now in the computer system's active memory 104*a*. To restore it after the save process has completed, there are also restore routines 129, which, for convenience are shown in the active main memory 104*a* also, although they can be swapped in when needed or as desired. The process will develop a header space 127*r*, and packets representing the nodes of the KStore structure as the process progresses, and will preferably work on the structure to be saved in active memory as area 127*s*. For convenient reference we refer to this work-space in memory as area 127. Alternatively, the space 127 can be very small, having only a currently in process node packet which is being created by the save routines 128, or alternatively being restored by the restore routines 129, if the KStore is being restored. If the KStore is being restored, space 127 may not be needed, but may be desirable as a test or working space where the KStore is being traversed and nodes are being added during the restore process. If the nodes are turned into packets and streamed as files out to memory as they are formed, they may be created at a speed at which they are streamed out immediately as stream files to permanent storage in at least such cases, allocating memory for the packet in the storage device is not a required step, since a stream file set up will cause the OS and the data storage system to handle this automatically.

It will be appreciated that while in the text example given above ("BOT-C-A-T-EOT" and "BOT-T-A-B-EOT"), the universe of the input is the set of alphanumeric characters from which words can be derived, the KStore datastore structure is not so limited. For example, the universe of the input may be text, such as letters (from which words may be derived) or words (from which phrases or sentences may be derived). Also, the universe of the KStore may alternatively be comprised of amino acids from which a genome can be derived, limited resources-used in a process, concepts, pixel sets, images, sounds, numbers, analog measurements or values or any other suitable universe which is composed of elemental units which can be digitized and sequentially combined to generate end products.

In addition to the above-described nodes, interlocking trees datastore (using the illustration of FIG. 9 for example) may also comprise a number of connections or links between nodes, such as links 96, 97, 99 and 98. Links in one embodiment of the invention are bi-directional. Links 96, 99, and 98 are referred to herein as asCase links. Links like 97 are referred to herein as asResult links. It may be recognized that in preferred embodiments of the invention, a root node representing a begin indicator concept or condition will have a null asResult list because a begin indicator will never be the second portion of a subcomponent, a root node representing a dataset element will have a null asCase list because a dataset element will never be the first portion of a subcomponent, and a root node representing an end indicator concept or condition will have a null asCase list because the end indicator will never be the first portion of a subcomponent. Finally, a root node comprised of an end product of a lower level will have a null asCase List because the end product acts as a dataset element for the next level.

All nodes of the interlocking trees data store may also include additional fields representing data associated with said nodes. This may be illustrated using FIG. 8.

Figure 8:
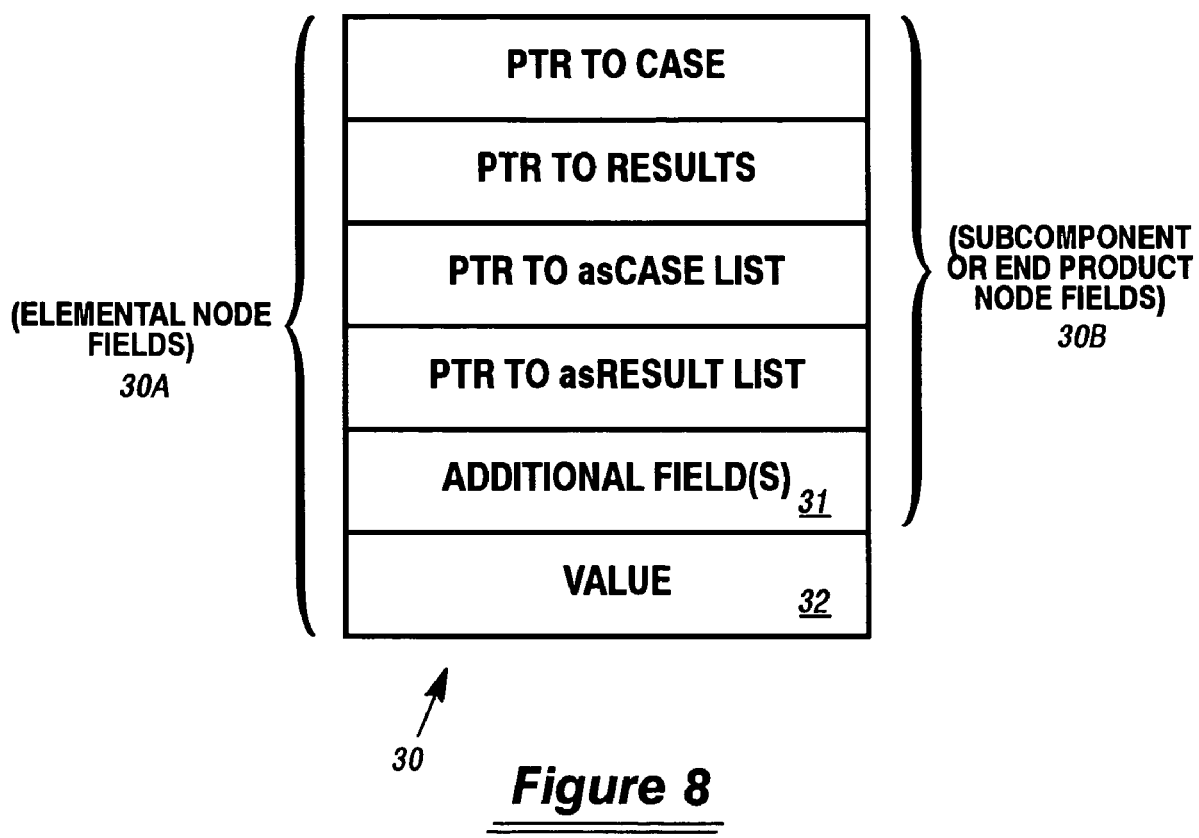
FIG. 8 is a block diagram illustrating a node from an interlocking trees datastores in accordance with embodiments of the invention.

An exemplary node 30 is shown in FIG. 8. This node 30 may include a string field, as the additional field, that contains a sequence that shows all of the elemental root nodes represented by this node. The addition of a string field including this sequence of elementals is helpful in debugging. There can be many uses for such additional fields and the nodes such as node 30 need not be limited to one additional field.

The exemplary node 30 may also include a count field as field 31. The count field is initialized and incremented with an intensity variable, whose value varies with conditions at times when the count field is being referenced. (An intensity variable is defined as a mathematical entity holding at least one unchangeable value). By making this term so broad the intensity variable populated count field can be used for applications of the inventive interlocking trees structure to processes dealing with forgetting erroneous recorded data, recording which entity is doing the inquiry, recording the type of inquiry being used, and other processes of interest which may be derived when using the data. A simple example form of an intensity variable would be a single ordinal field value, such as '1' to be used to increment or decrement count fields to record the number of times that a node has been accessed or traversed.

Further, the intensity variable may change at different rates and in different directions for these various functions. A simple example of different intensities might be the addition, of a value +1 each time a query traverses a node, and the addition of a value of −100 if a path containing that particular node (or that particular sequence of nodes) is deemed (for some overarching reason not of importance to this explanation) to be a mistake, such as when a sequence is found after use to have been a misspelling, or in the case of where a sensor finds an area containing a dangerous chemical, or if a human child simulator "touches" and "burns itself" on a hot stove in simulation. An alternative to intensity variables is to use a separate node to hold a new value for each kind of node traversal, thus creating a cluster in situations where a node is accessed during queries of type one, type two, experience one, experience two, etc, ad infinitum. In present thinking regarding real world applications of this structure, intensity variables in a count field provide the simplest and thus the current best approach to this problem, however, this or other alternatives should be considered and reconsidered as information processing systems mature. If this alternative is considered, an approach of using a separate node, possibly even an elemental or root node to record a count for the number of traversals of each type related to the node would be one way to implement this approach.)

Thus, in one use, the count field may be incremented when new data is being incorporated in the interlocking trees data store but incrementing the count field may be omitted when the interlocking trees data store is being queried yielding a bigger value for new data and no change for inquiries. Accordingly, this intensity variable must be chosen for its suitability to the problem being addressed by the invention.

The count field is added to facilitate use of the knowledge store represented by the interlocking trees structure and are particularly useful when statistics, such as frequency and probability are sought.

Note that this node 30 can be an elemental node 30A having a value field 32, or a subcomponent node or end product node 30B, (which is missing the value field 32), but in either instance it may have an additional field or fields 31.

A specific instance of an additional field is shown in FIG. 8, here the node, such as node 30 (either an elemental node 30A (with a value field 32) or a subcomponent or end product node 30B) both have the additional field 31.

AsCase lists and asResult lists may be implemented as linked lists. In another embodiment, the asCase lists and asResult lists are allocated as blocks of contiguous memory locations of configurable size, such as but not limited to arrays, the pointer to asCase list is set to the beginning location of the asCase list memory block and the pointer to the asResult list is set to the beginning location of the asResult list memory block. This metadata about the structure of the KStore being saved is important and may require specific action to save it into the header, unless the Address Translation Table, described below, contains sufficient information by recording addressing to handle this. The kind of metadata this represents is called KStore state variable data.

In one embodiment of the invention, in addition to creating links from the new node to the nodes from which the new node is derived, asCase list and asResult list links are created by adding a pointer to the location of the new node to the linked lists, asCase list and asResult list, of the nodes from which the new node is derived. The pointers may be added to the end of the list, to the beginning of the list, or may be inserted somewhere within the list. Additionally, a number of lists may be maintained. For example, a node's asCase list may include a sequential list wherein pointers are added to the end of the linked list in addition to an ordered list wherein pointers are maintained in an order of most frequently accessed. It will be understood that although the example given cites one ordered list and one sequential list, the invention is not so limited, any combination and number of lists is contemplated as within the scope of the invention. An ordered list may be ordered by last update, last access, or frequency of update or access, or by any other suitable ordering rule: Information regarding this structure may need to be saved as metadata as well, and it is also considered KStore state variable information.

In most preferred embodiments of the KStore data structure, nodes representing the dataset elements of the higher level do not contain data or representations of data or concepts; that is elemental root nodes representing dataset elements of a higher level contain only pointers to nodes in a lower level. Such would be another aspect of metadata needing saving.

Any suitable number of levels may be generated. For example, in the world of text, levels may represent letters, words, sentences, paragraphs, chapters, books, libraries and so on. It will be understood that although in the exemplary figure, two levels of the interlocking trees datastore the KStore invention is not so limited. Any number of levels of the interlocking trees datastore can be constructed. Because the universe of this example is text, that is, combinations of letters form words (one level of end products), the result of the combination of words in this embodiment of the invention is a phrase or sentence (another level of end products). Sentences may be combined to form paragraphs, paragraphs may be combined to form chapters or sections and so on.

The elemental nodes and their values need to be stored in order to restore the KStore properly. If the elemental values are saved independent of the nodes in the ordinary course of creating a KStore structure, these file(s) of elemental values and the pointers back to the elemental root nodes can simply be saved as is (with accommodation for the addressing changes that might be needed for the pointers as described with respect to pointer addresses generally). In the case of a KStore where the elemental values are actually stored in the nodes, the values will be saved with the other elemental node information when the nodes are saved during a save operation. Thus it will be apparent that the save process will be tailored to the KStore being saved.

It will be further understood that depending on the input universe, end product nodes may represent entities other than words, phrases, sentences and so on. To offer one example of many: if the input is a sequence of amino acids comprising a chromosome, one end product may represent a gene or an allele. In another example, pixel sequences may have end products that are lines, circles or other shape items.

Searching the KStore structure is relatively straightforward, has been described in previous patent applications, and a complete understanding of how to do so is not required for knowing how to save and restore the interlocking trees datastore that we call KStore. Nevertheless, a brief description is included for convenient reference.

Now consider that input for FIG. 10 comprises data records such as the following:

Bill Tuesday 40 sold PA
Bill Monday 103 sold NJ
Bill Monday 100 trial PA
Tom Monday 80 trial PA
Tom Monday 13 trial NJ.

In one embodiment of the invention, the dataset elements are comprised of fields of information separated by a delimiter such as but not limited to the blank character. In one embodiment, the dataset elements are derived from the input, although it will be understood that the invention is not so limited, as described above. Dataset elements encountered thus far in the input data are salesman name, (Bill and Tom), days of the week (Monday, Tuesday), number of items (40, 103, 100, 80, 13), status (sold, trial) and state (PA, NJ). In one embodiment of the invention, the interlocking trees datastore 1000 of FIG. 10 will result from this input. In FIG. 10, for space reasons, the first portion of the node is not shown. For example, although node 1002 is labeled "Bill", node 1002 actually represents "BOT-Bill". Although node 1004 is labeled "Tuesday", node 1004 actually represents "BOT-Bill-Tuesday" and so on.

For example, in one embodiment of the invention, nodes and end products containing a desired dataset element can be determined by following the pointers contained in the asResult list of the particular node representing the dataset element. The asResult list is accessed and each pointer in the list is followed to the asCase branch associated with that node. If end products are desired, the asCase branch tree is followed to the leaf node of the branch.

In one embodiment of the invention, a request for information is in the form of specifying constraints (which can be seen as either a "context" or a "focus" depending upon perspective). For example, a request for information may be in the form of a list of constraints. The list of constraints may be nested or independent. In one embodiment of the invention, the asResult list of each listed constraint is found, branches for each node within each as result list for each constraint are found, the branches are followed to their end products and the intersection of the end products for each branch within each asResult list for each constraint is selected. Nested constraints are found by first constraining the datastore to retrieve a set of data which is then used as the set of data to be further constrained, and so on.

Logical operators can be used in defining constraints. One can say that one is looking for nodes that identify-persons, places AND things, wherein AND would be a logical operator specifying the joiner of sets of all persons, places and things; i.e., all nodes identifiable by the elementals or root nodes called "persons," "places" and "things." The interlocking tree structure given the query, what are all "persons" AND "places" that ARE (another logical operator) "things" would be constrained to answer by howsoever the item "things" are identified. If in constructing the structure, things never pointed to places, then all other "things" would not be found in the query, but all places known in the interlocking tree structure would be. If people were considered things when incorporated into the structure, they would be found in the query too.

Logical operators can take many forms, such as AND, OR, NOT, GreaterThan, XNOR, EqualTo, and the like, and may also be combined. All such logical operators and combinations thereof will be useable within this invention. Comparative mathematical expressions will also be useable, depending of course on context. Find all salesmen having sold more than 100 cars, might be a query depending upon a comparative mathematical expression for an example, where that expression would be salesmen having sales of cars being a number >100.

In one embodiment of the invention, the focus determines the information that is returned. In the case of a two-level datastore in which the dataset elements are letters, level one end products comprising words and level two end products comprising sentences, and the specified constraints are, specific letters, specifying the focus to be "words" will result in the return of only words, specifying the focus to be "sentences" will result in the return of only sentences. Retrieval of end products from the first level would result in the return of words. Thus, a "focus" identifies the type of information desired within the context. Retrieval of end products from the second level would result in the return of sentences. In one embodiment, to retrieve sentences, the asResult list of each word is followed up to the next level and the specified branch is followed to its end product to retrieve the sentence including the specified letters.

In one embodiment, by following the tree having the level begin indicator as its root, all end products beginning with a constraint can be found, (e.g., all the words beginning with a specified letter can be found. Similarly, all end products with a specified constraint, or a specified constraint in a specified position, (e.g., all the words that have a specific letter in them or all words having a specified letter in a specified column) can be found. Similarly, by following the tree having the level end indicator as root, all end products that end in a specified constraint can be found (e.g., all words ending in a specified letter.) A plurality of constraints and/or foci may be specified.

For a partial save, any constraints may need to be saved to indicate the limits of the partial save. Thus, relating this to FIG. 10's KStore, putting in the header "all information from May" would indicate that the saved KStore contains only information from May.

Referring now to FIG. 10, suppose the answer to the question of what is the total number of units sold on Tuesday is desired. It will be apparent to one of skill in the art that, instead of traversing all the nodes in the entire datastore, in one embodiment of the invention, retrieving this information requires only the retrieval of the asResult lists of elemental root nodes 1054 and 1055. Branch 5 1030 is traversed because node 1004 is pointed to by the elemental node representing Tuesday 1054 and because node 1026 is pointed to by the elemental node representing sold 1055, and branch 4 1040 is traversed because node 1028 is pointed to by the elemental node representing sold 1055. Branches 1, 2 and 3 1060 do not have to be traversed. The intersection of the sets of end products returned from following branches pointed to by elemental nodes 1054 and 1055 comprises node 1030 representing Bill Tuesday 40 sold PA.

The number of units sold may be determined by following the pointers from node 1024 to the root node representing the number 40 (not shown). It will be understood that this step can be performed after the intersection of end products is found or this information may be retrieved and stored as the branch is traversed.

Figure 2:
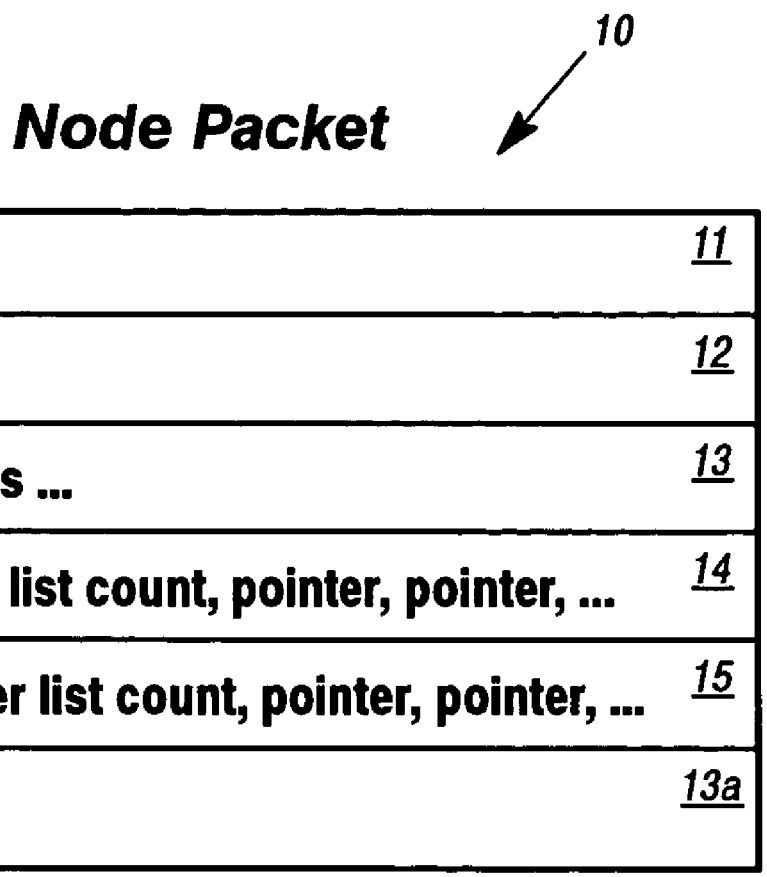
FIG. 2 is a block diagram of a node packet in accordance with a preferred embodiment of the invention.

Refer now to FIG. 2 in which a node packet containing the fields of information needed to store the information from the node in accord with the preferred embodiments of this invention is described. The first field is the case pointer field 11, relating of course, to the pointer to case field of node 30 from the FIG. 8 description. The next field is the result pointer 12 containing the pointer to result field data from the node of FIG. 8. The additional field 13 is abbreviated here for simplicity and may include any additional fields as well as the value field from node 30 of FIG. 8.

As may be recalled from the description of the preferred embodiments of the interlocking trees datastores of patent applications Ser. Nos. 10/385,421, and, 10/666,382, the asCase list as well as the asResult list, was not itself stored directly in the node, merely a pointer in the node indicated in the area in which the list was stored. However, in saving in order to be able to restore the interlocking trees datastores structure, we prefer to save the asCase pointer list along with the node packet. Thus, in field 14 the count of all the pointers as well as the pointers themselves are stored for the asCase list. The asResult list field 15 does similar storage of data for the asResult pointer list.

Having become familiar with the basic structure of the units to be saved, an explanation of the process for making the save now follows.

Figure 3:
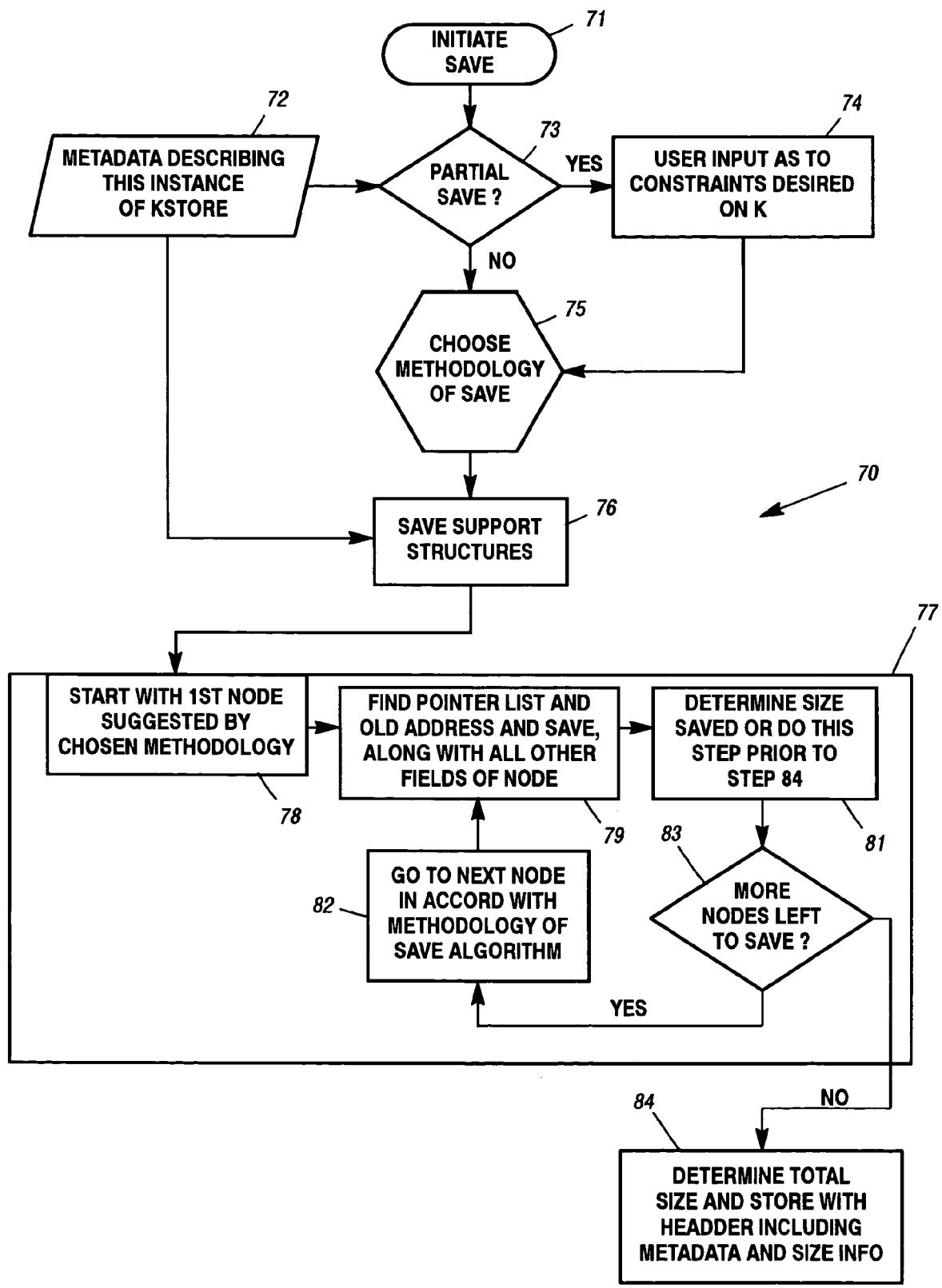
FIG. 3 is a flow diagram illustrating a preferred form of a save process in accord with the invention.

Refer now to FIG. 3 in which a flowchart 70 illustrates a preferred embodiment of the save portion of the invention. It begins when a user or system decides to initiate a save in step 71. A determination is made or indicated that a partial save or a full save is expected in query 13. In the construction of the KStore, a set of metadata 72 may have been created describing the particular KStore instance under consideration. Assuming that a partial save is selected, user input 74 (which could also be considered user input if it comes from an automatic system) as to the desired size, particulars of the root nodes and other aspects of the parts of the KStore necessary for the save will be available for this process.

In step 75, one of at least three methodologies is chosen in order to make a save of the Kstore data structure possible. If this is not a partial save, this selection of methodology will occur without any user input as to the constraints on the KStore data structure. Although it is possible to do later, in the preferred methodologies of the invention, the supporting structures including various aspects of metadata should be saved first in step 76. In step 77, the nodes and the bulk of the KStore data structure will be saved. If a currently non-preferred methodology is chosen for saving the KStore structure, it is possible to complete step 77 in a single step; if a memory image can be saved with all of the memory addresses intact and restored to the same location, step 77 could be accomplished as a single step; However, this is not likely to be possible in the case of a partial save nor is it possible in situations where the KStore structure will be moved from one computer to another or where there is a lack of control over the exact location within the main memory to which the save structure can be restored. In step 7, the first step is to begin with the first node suggested by the chosen methodology in step 78 and to find the pointer list and old address and save from the main memory of that node and save this along with all other fields of the node in step 79. The size of the packet being saved for this node is preferably determined at this point so that the ultimate size of the stored data structure will consist of the header with its metadata resources and the data packets following there behind in serial fashion or other similar structure. Thus, step 81 being accomplished for each of the packets, a total of all the size of the packets can be immediately found by simply adding up the sizes of each of the packets as they are prepared.

If we are in a situation where the KStore is the only application that will use the computer system, it is possible to know that there won't be any intermediate IO functions occurring and accomplish the save in an atomic manner. However, this is not usually the case in the current environment of computer systems today. Thus, FIG. 2 illustrates the intermediate data structure of the KStore packets and header being prepared to save in an atomic fashion to a disk drive or other permanent data storage device.

After preparing the packet and determining the size of the packet in steps 79 and 81, the question must be answered whether there are further nodes to save within this KStore in accord with the chosen methodology and/or within the constraints selected in step 74. Assuming the answer is yes, step 82 moves to the next node in accordance with the methodology of the save algorithm. These methodologies will be described later.

If there are no more nodes to save, the total size of the KStore structure is determined in step 84 following which the KStore structure is prepared to be saved and may be saved.

As mentioned briefly above with respect to step 75, There may be several ways to conduct a Save process. The method chosen may be selected as appropriate. Assuming we are not using a whole memory swap process, but a normal save, the process will have at least three steps before writing a node packet or packets in a group to permanent storage. There will be a saving of supporting structures which could be an automated or user assisted process. There will have to be a traversing step, where the process accesses each relevant node (some nodes may be excluded in partial saves, but otherwise substantially all nodes will be accessed). The data from each node will then have to be converted into a packet for saving. Then the saving process can occur, employing any housekeeping systems employed as may be needed by the hardware and software in which this structure may be running requires.

The saving of supporting structures will first require determining which informational structures will be saved with the interlocking trees data store. This may include structures such as but not limited to; a file header containing a creation date, KStore file ID, and so on, a list of elemental root nodes, sensors, a list of strings representing BOT-EOT monads, or at least the list of EOT nodes contained in the interlocking trees data, metadata such as might describe the data structures of the underlying OS or computer system in which it resides, password protection if any, how lists of pointers are ordered in the nodes, and any information of that nature if needed to restore the structure or determine the addresses of information in the structure which is being saved. Additionally the header may save k state variables (such as how many additional fields are supported in a node, what kinds of queries may be going on, how the asCase and asResult lists are structured, data sources, switches and data streams) and/or data sources descriptors such as hooks identifying what sources to accept queries and or get information from and the like. Of course, all this data should be formatted for writing and retrieval as may be needed by the OS and other features of the computer system beings used. Also, if the KStore will have XML formatting or access, that kind of information should be stored too, as the KStore itself will (probably) not know that information about itself.

Thus, to list the items likely to be found in headers, Header record may contain:
  creation date
  version/cycle of Save program that created the save file
  OS underlying structure information (size of fields)
  sign structure information, if not saved below
  "other" structures, information
  sensors
  levels and associated delimiters
  meta data—field types (including user defined types), column descriptions permissions, etc
  kState variables—switches, data streams, sign structure information (for instance special ordering for asCase list)
  data sources (types, locations, affiliated data streams)— for learning new knowledge security (administrator & user passwords, permissions, saved query locations, triggers)

Now we describe the alternative methods of traversing for saving the KStore interlocking trees datastore structures.

Traversing the interlocking trees datastore to access each node starting from the primary root, using a sequential tree traversal along the asCase paths for each primary root node. For example, if we started with the primary root node EOT 1050 in FIG. 10, we would first go to Bill, and get all his strings to EOT nodes 1030, 1040, and 1060, then to Tom and his EOT nodes until all links to EOT node 1061 are reached. At this point all the nodes will have been accessed, except for the elemental root nodes. Recall that we have a file of elemental root node values and pointers and they can be accessed that way.

Traversing the interlocking trees data store to access each node from endproduct nodes is a second method. They are all accessible through the EOT node 1061. Thus a partial save can be conducted by traversing the KStore, through the desired constraint list of endproduct nodes.

Traversing the interlocking trees data store to access each node from root nodes is a third way to traverse the interlocking trees datastore structure. Thus a partial save can be conducted by traversing the KStore, through the desired constraint list of root nodes, by following all the asCase links from each of the root nodes in the desired constraint list.

Restore Process Flow.

Figure 4:
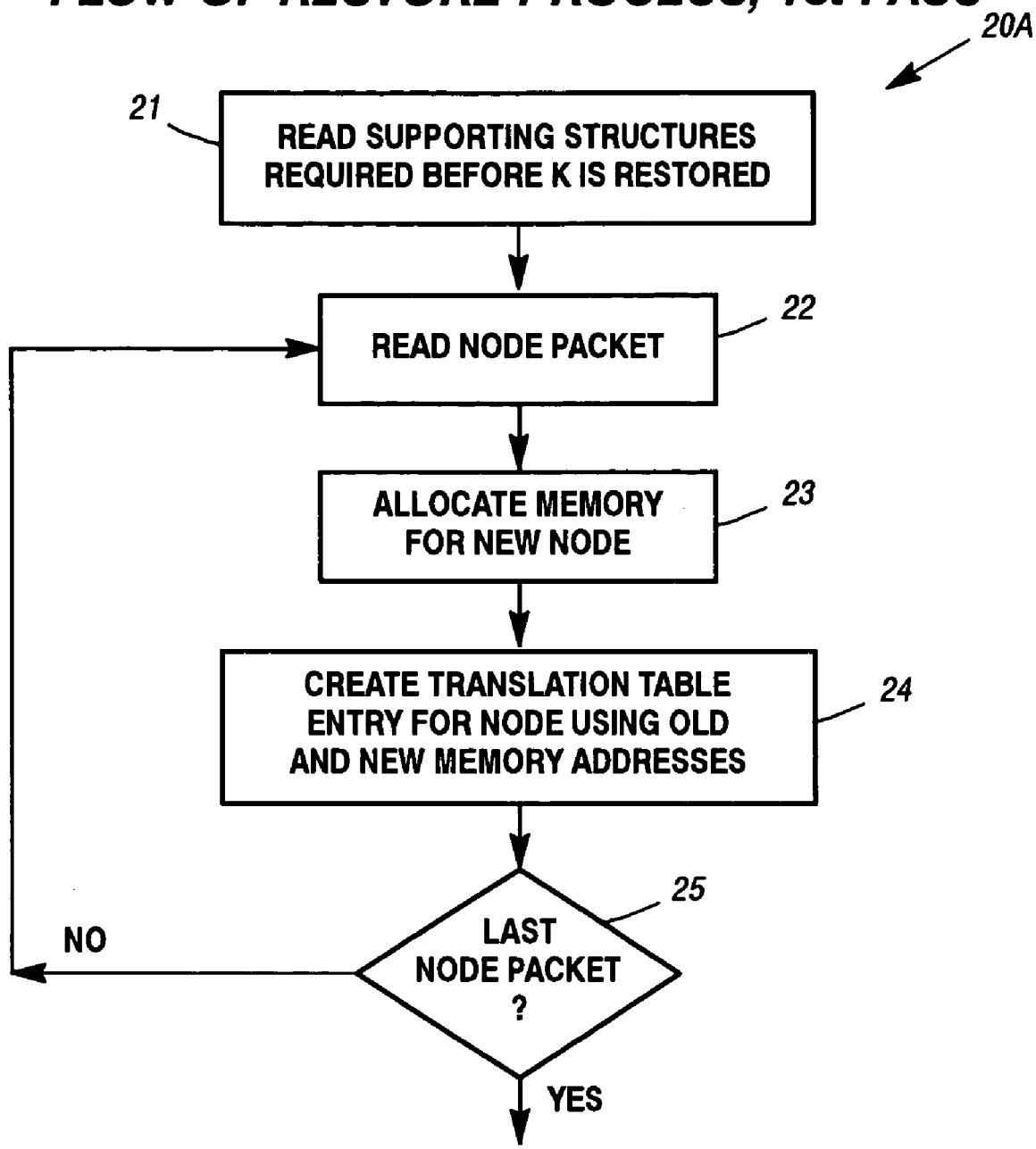
FIGS. 4, 5, and 6 are flow diagrams illustrating a preferred form of a restore process in accord with the invention.
Figure 5:
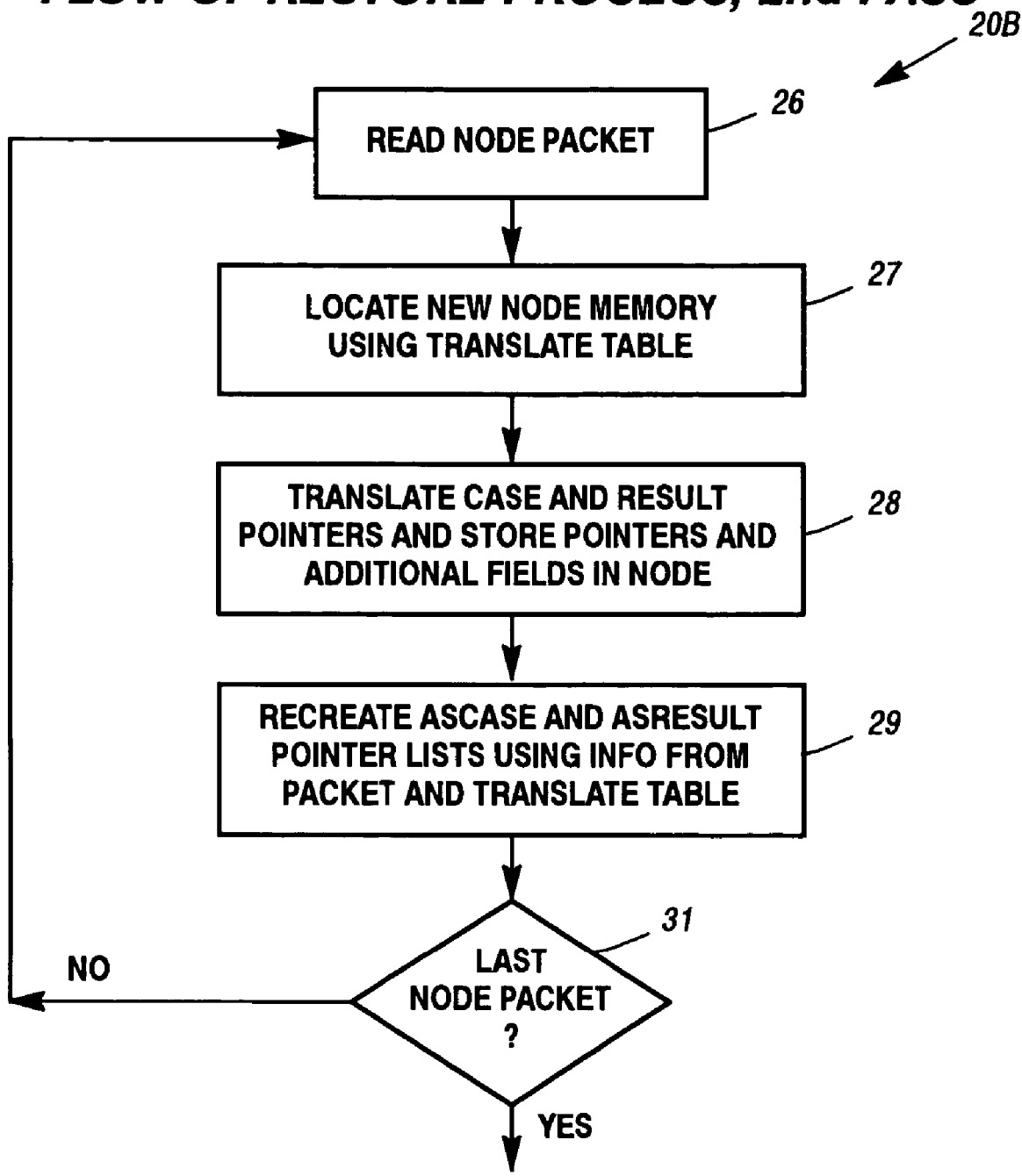
Figure 6:
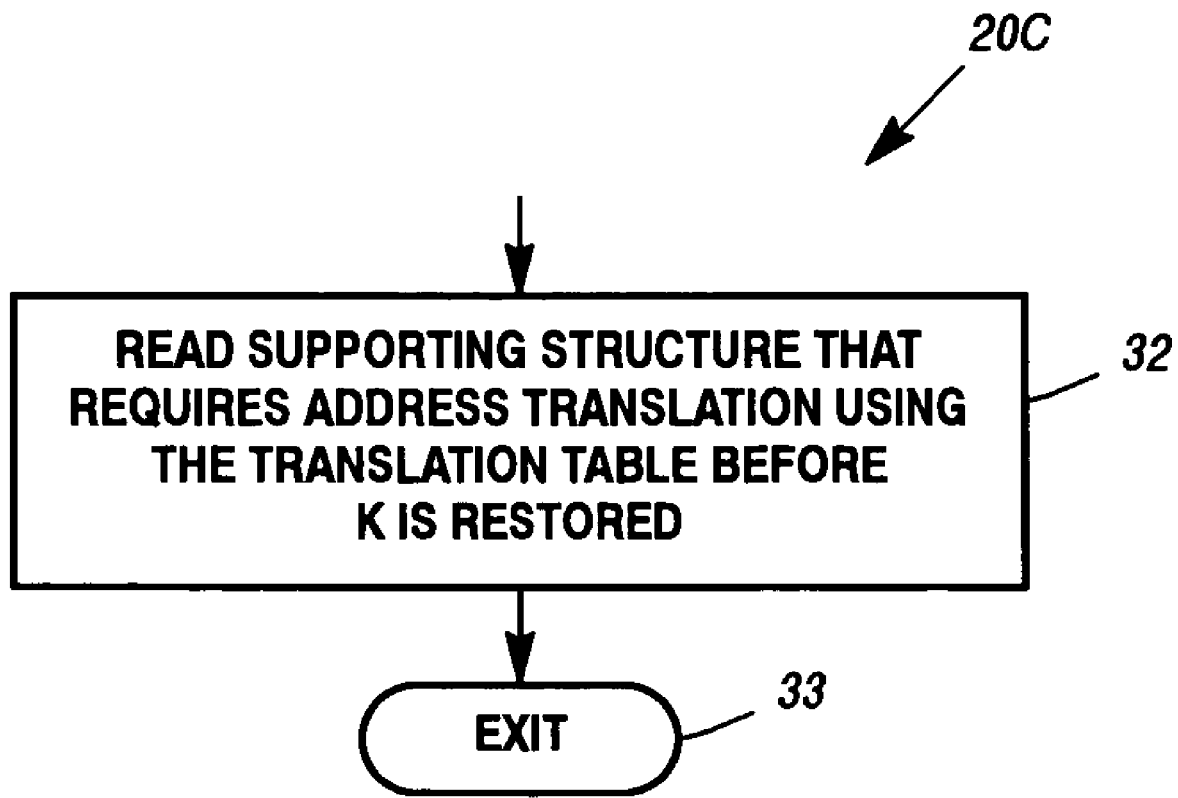

The flow diagram of the restore processes are broken across three figures for ease of description; FIGS. 4, 5 and 6. FIG. 4 describes the first pass, FIG. 5 describes the second pass, and FIG. 6 describes an end point for the restoration process. In the preferred embodiment, in the first pass 20A of the flow restoration process, we first read supporting structures required before the interlocking trees datastore (here abbreviated as K) is restored 21. To restore the interlocking trees datastore, we must restore all node packets and since they are stored seriatim, restoration in its easiest form would be through a serial restore in the same order.

Accordingly, first we read the first node packet 22 and use the operating system of the computer we are working on to allocate memory for this new node in step 23. If this is the first time and this is the first time because we are using the first pass part of the process, we create or begin to create the translation table and the translation table entry for this node using the old memory address which was stored with the node and the new memory address which the operating system or computer system will now assign to this node.

As an aside, it should be recognized that for machines and operating systems that can transparently and reliably move whole blocks of memory the size of the datastore under consideration as a single unit assigned to the same memory addresses, in such systems there is no need for the detailed save and restore process described here. However, at the present time there are some memory file types which have been discussed but are not fully implemented and accordingly resort to more complex save and restore mechanisms such as are described in this invention are required.

If the last node packet has been allocated memory and received a table entry in steps 23 and 24, then we can move beyond the question at step 25, however if not we must read all of the node packets available within the permanent memory record of the interlocking trees datastore "K".

After the first pass processes are complete, the restoration process requires the second pass processes of FIG. 5 to take place. The node packets again are read in order in step 26. The new node memory is located using the translate table created in step 24 in step 27. The case and result pointers are translated using the translate table, and these pointers and additional fields are then stored into the node in the active memory of the computer system all in step 28. Next, the asCase and asResult pointer lists need to be created in step 29 using, information from the node packet and the translate table to restore the pointers to the new addresses corresponding to where the pointers had been pointing as per the old addresses. This is iteratively processed until the last node packet is reached in question 31, at which time the supporting structures that require address translation using the translation table step 32 in FIG. 6 must be accomplished. At this point the interlocking trees data structure should be restored to the new memory.

An address translation table 40 is illustrated in FIG. 7. In it an old memory address list 41 is shown corresponding to new memory address list 42 such that for example in old memory address 1 (41a) will correspond to a new memory address 1 (42a) and so on. Thus, every time an old memory address is being used, that is, restored, the new address into which the node/packet being restored is being loaded into is going to be maintained in the memory address translation table 40, linked to the old memory address.

In even more preferred embodiments, a KStore structure is constructed equating old to new memory addresses in accord with the teachings of the earlier referenced and reiterated disclosures regarding the formation of interlocking trees datastores, as and when the process of the restore is occurring. Thus instead of a table, a KStore structure can be queried to obtain address conversion more quickly as the KStore is being restored.

Additionally, in reconstruction of a KStore, i.e., restoring it, the data from the elemental root nodes can be restored first, thus making the process of performing the restore quicker since the establishment of elemental root nodes will establish a large network of links quickly.

The methods and systems described above may be embodied in the form of program code (i.e., instructions) stored on a computer-readable medium, such as a floppy diskette, CD-ROM, DVD-ROM, DVD-RAM, hard disk drive, or any other machine-readable storage medium including yet to be available optical and nanotechnology storage and the like, since the medium should not change the operations of the structure nor the methods from what has been described herein. In all such data storage when the program code is loaded into and executed by a machine, such as a computer, the machine becomes an apparatus for practicing the inventive methods and provides a form of the inventive system as described herein. The present invention may also be embodied in the form of program code that is transmitted over RF or some transmission medium, such as over electrical wiring or cabling, through fiber optics or in the clear optics, over a network, including the Internet or an intranet, or via any other form of transmission, wherein, when the program code is received and loaded into and executed by a machine, such as a computer, the machine becomes an apparatus for practicing the inventive methods and provides a form of the inventive system as described herein. When implemented on a general-purpose processor, the program code combines with the processor to provide a unique apparatus that operates analogously to specific logic circuits, which themselves could be used for the invention. The program code may be implemented in a high level programming language, such as, for example, C, C++, or Java. Alternatively, the program code may be implemented in assembly or machine language. In any case, the language may be a compiled or an interpreted language.

It is noted that the foregoing examples have been provided merely for the purpose of explanation and are in no way to be construed as limiting of the present invention. For example, the KStore interlocking trees datastore can be implemented using object-oriented technologies, procedural technologies, a hybrid thereof or any other suitable methodology. Furthermore, although the examples presented show the dataset elements stored in a memory of a computer system, one of skill in the art will understand that this functionality can be implemented in many different ways, and can be used in specific purpose devices as well as general purpose computer systems. For an example of the many different embodiments contemplated, the invention contemplates the use of many different sets of dataset elements of many different universes stored on multiple remotely located machines.

What is claimed is:

1. A method of saving an interlocking trees data store from memory to permanent storage comprising the steps of:
   traversing the interlocking trees data store to access each node;
   creating a node packet containing all information relevant to the node; and
   writing the node packet to permanent storage:
   wherein,
      the interlocking trees datastore structure comprising elemental root nodes, subcomponent nodes and end-product nodes using asCase and asResult bi-directional links used in determining paths within the interlocking trees datastore structure;
      the asCase bi-directional link represents a pointer to a first of two nodes from which a particular node is created; and
      the asResult bi-directional link represents a pointer to a second of two nodes from which the particular node is created.

2. The method according to claim 1, wherein said saving of an interlocking trees data store from memory to permanent storage further comprises the step of:
   saving supporting structures to permanent storage.

3. The method according to claim 2, wherein the step of saving supporting structures comprises saving any of the following list of structures needed to restore the interlocking trees data store to memory, wherein said list includes:

KStore name, creation date, version or cycle of Save program that created the save file, operating system underlying structure information including at least size of fields used information, sign structure information, elemental root nodes and elemental root node values and pointers to the elemental root nodes' levels and associated delimiters;

meta data including one or more of the following field types:
user defined types, column descriptions, and permissions;

kState variables including one or more of the following:
switches, data streams, and sign structure information for instance special ordering of asCase bi-directional links in asCase lists;

data sources including one or more of the following:
types, locations, affiliated data streams for learning new knowledge security including one or more of the following:
administrator passwords, user passwords, permissions, saved query locations, and triggers; and
XML-related meta data.

4. The method according to claim 2, wherein saving supporting structures comprises the steps of:
determining informational structures to be saved with the interlocking trees data store; and,
formatting and writing said informational structures to permanent storage.

5. The method of according to claim 1, wherein creating a node packet containing all information relevant to the node, comprises the steps of:
storing the node's current load address in the packet;
storing the asCase and asResult bi-directional links, any other additional fields, an asCase list of pointers and an asResult list of pointers in the packet; and
writing the node packet to permanent storage.

6. The method according to claim 5, wherein prior to storing any packets, memory is allocated for each packet to be stored.

7. The method according to claim 1, wherein traversing the interlocking trees data store to access each node comprises the steps of:
traversing the interlocking trees data store to access each node starting from the primary root, using a typical tree traversal along asCase paths comprising a set of asCase links connecting nodes.

8. The method according to claim 1, wherein traversing the interlocking trees data store to access each node comprises the steps of:
traversing the interlocking trees data store to access each node beginning from an end product nodes.

9. The method according to claim 8, wherein said traversing beginning from end product nodes begins after obtaining access to all end product nodes from a file of end product node information associated with said interlocking trees datastore.

10. The method according to claim 1, wherein traversing the interlocking trees data store to access each node comprises the steps of:
traversing the interlocking trees data store to access each node from a root node.

11. The method according to claim 10, wherein said traversing beginning from said root nodes begins after obtaining access to all root nodes from a file of root node information associated with said interlocking trees datastore.

12. A computer readable storage media containing encoded data comprising a set of instructions executable on a computing system which when executed configure said system to provide the facility to save and restore a trees based datastore, said set of instructions comprising:
a save set having:
a first set to traverse the interlocking trees data store to access each node to be saved;
a second set to create a node packet containing all information relevant to the node to be saved; and
a third set to write the node to be saved as a packet created by the second set to permanent storage connected to said computing system;
wherein,
the interlocking trees datastore structure comprising elemental root nodes, subcomponent nodes and end-product nodes using asCase and asResult bi-directional links used in determining paths within the interlocking trees datastore structure;
the asCase bi-directional link represents a pointer to a first of two nodes from which a particular node is created; and
the asResult bi-directional link represents a pointer to a second of two nodes from which the particular node is created.

13. A computer system having an interlocking trees datastore in a memory of said computer system and having a saving means for saving said interlocking trees datastore for later restoration, said saving means comprising:
means for locating and saving all relevant header information including metadata relevant to restoring said interlocking trees data store,
means for locating each node in said interlocking trees data store and means for saving all data about each located node in a packet form;
wherein,
the interlocking trees datastore comprising elemental root nodes, subcomponent nodes and end-product nodes using asCase and asResult bi-directional links used in determining paths within the interlocking trees datastore structure;
the asCase bi-directional link represents a pointer to a first of two nodes from which a particular node is created; and
the asResult bi-directional link represents a pointer to a second of two nodes from which the particular node is created.

14. The computer system according to claim 13, wherein said means for saving all data determines a saved size for said packet form of said all data about each located node.

15. The computer system according to claim 14, wherein a total size of a saved interlocking trees datastore saved by said saving means is a function of said saved size for each said packet.

16. The computer system according to claim 13, wherein said each packet contains pointer data pointing to addresses of other nodes of said interlocking trees data store that had been linked to the node from which said each packet is constructed in said means for saving.

* * * * *